United States Patent [19]
Lotz

[11] Patent Number: 5,910,695
[45] Date of Patent: Jun. 8, 1999

[54] DAMPING DEVICE FOR A MAGNETICALLY SUPPORTED ROTOR

[75] Inventor: Heinrich Lotz, Wetzlar, Germany

[73] Assignee: Pfeiffer Vacuum GmbH, Asslar, Germany

[21] Appl. No.: 09/047,992

[22] Filed: Mar. 25, 1998

[51] Int. Cl.[6] .............................. H02K 7/09; H02K 5/24
[52] U.S. Cl. ........................................... 310/90.5; 310/51
[58] Field of Search ...................................... 310/51, 90.5

[56] References Cited

U.S. PATENT DOCUMENTS

| | | | |
|---|---|---|---|
| 5,394,044 | 2/1995 | Yamamura | 310/90.5 |
| 5,521,448 | 5/1996 | Tecza et al. | 310/90.5 |
| 5,679,992 | 10/1997 | Miyamoto et al. | 310/90.5 |

*Primary Examiner*—Clayton LaBalle
*Attorney, Agent, or Firm*—Anderson, Kill & Olick, P.C.

[57] ABSTRACT

A damping device for a rotor supported by an arrangement of magnetic bearings including at least one radial bearing formed of a stator magnet and a rotor magnet, with the damping device, including an intermediate member fixedly connected with the rotor by the stator magnet of the at least one radial bearing, and connected with a stationary part in an axial direction by connecting elements including spherical recesses formed in the intermediate member and in the stationary part and balls located in opposite recesses of the intermediate member and the stationary part, with spherical recesses having a diameter larger than a diameter of the balls, and with the balls or surfaces of the recesses being formed of an elastically deformable material having a modulus of elasticity smaller than a modulus of elasticity of a metal.

8 Claims, 3 Drawing Sheets

DAMPING DEVICE FOR A MAGNETICALLY SUPPORTED ROTOR

BACKGROUND OF THE INVENTION

1. Field of the Invention

The present invention relates to a damping device for a rotor supported by an arrangement of magnetic bearings including at least one radial bearing formed of a stator magnet and a rotor magnet.

2. Description of the Prior Art

Different versions of electronically controlled or mechanically supported magnet bearings for contactless support of rapidly rotating rotors are disclosed in literature. A common feature for all of them is an occurrence of axial and radial oscillations which mark resonance positions of the rotor, in particular at continuous rotation. This can lead to critical situations when magnetic bearings are used for rotors, with which very narrow tolerances should be used, e.g., for rotors of turbomolecular pumps. Such critical situations can result in running of rotors into stators and to the destruction of the entire apparatus. Therefore, it is important to provide these bearings with appropriate damping elements to insure a reliable and quiet operation of the rotor.

There are different methods for damping of magnetically supported rotors. Here, in particular, methods used for damping of radial magnetic elements are considered. At that, damping with eddy currents is of a small interest because they have poor damping characteristics. However, damping devices, in which an intermediate member is used, proved themselves. German Patent No. 2,658,925 and a book by Pollermann "Constructional Elements of Physical Technology" (Bauelemente der physikalischen Technik), Springer-Verlag, 1955, pp. 97–98, disclose mechanical damping elements which act on a rotor via an intermediate member. However, the intermediate members used there are not fixed axially. For rotors, which have only minimal axial tolerances, these damping elements are not suitable. Other solutions require the use of intermediate members having a relatively large mass which negatively influences the damping characteristics of respective devices. Also known are mechanical damping devices in which fluid-filled constructional elements are used. Poor damping characteristics and an unreliable operation limit the possibilities of use of such devices. Complicated constructions, e.g., ones disclosed in German Publication DE-05 32 39328 or constructions which require an extensive centering of the intermediate member, do not constitute an advantageous solution.

Accordingly, an object of the present invention is to provide a damping device for a magnetically supported rotor without the above-listed drawbacks.

Another object of the present invention is to provide a mechanical damping device with an intermediate member which is axially fixed but is radially displaceable.

A further object of the present invention is to provide a damping device with an intermediate member which has a simple structure, in which the geometrical expansion of elements is kept within certain limits, and in which the centering is insured with simple means.

A still further object of the present invention is a damping device with an intermediate member and having a minimum of additional constructional elements.

SUMMARY OF THE INVENTION

These and other objects of the present invention, which will become apparent hereinafter, are achieved by providing a damping device in which the intermediate member is fixedly connected with the rotor by the stator magnet of the at least one radial bearing, and is connected with a stationary part in an axial direction, with the connecting means including spherical recesses formed in the intermediate member and in the stationary part, and balls located in opposite recesses of the intermediate member and the stationary part. The spherical recesses have a diameter larger than a diameter of the balls, and the balls or the recess surfaces are formed of an elastically deformable material having a modulus of elasticity smaller than a modulus of elasticity of a metal of which the other component of the connecting means is generally formed.

Supporting the intermediate member with balls which are located in spherical recesses formed in the intermediate member and in the housing part permits to fix the rotor axially and to damp its radial deviations. The axial bearings at that are driven so that an axial force is available which insures centering of the balls in the spherical recesses when axial deviations occur. This permits the use of an intermediate member having a simple construction. Centering is effected without any adjustment, by direct shifting of the balls. The spherical shape of the recesses insures an easy manufacture, and the surface shapes are easily adapted to meet the necessary bearing and damping characteristics.

An important advantage of the present invention consists in that the damping action is directly integrated into the bearing elements. The formation of the balls or of the surfaces of the spherical recesses of an elastically deformable material provides for absorption of energy generated as a result of oscillations. In this way, the balls or the spherical recess surfaces function as damping elements. At that, care should be taken that the loading of the balls or the recess surfaces remain in the elastic region of the deformable material they are formed of a greater axial stiffness in comparison with a radial stiffness is achieved by using a sufficient number of balls and respective recess pairs. This also permits to reduce surface loading of separate balls, which reduces rolling resistance. While additional damping elements are not necessary, they can be used when extreme operational conditions are present.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
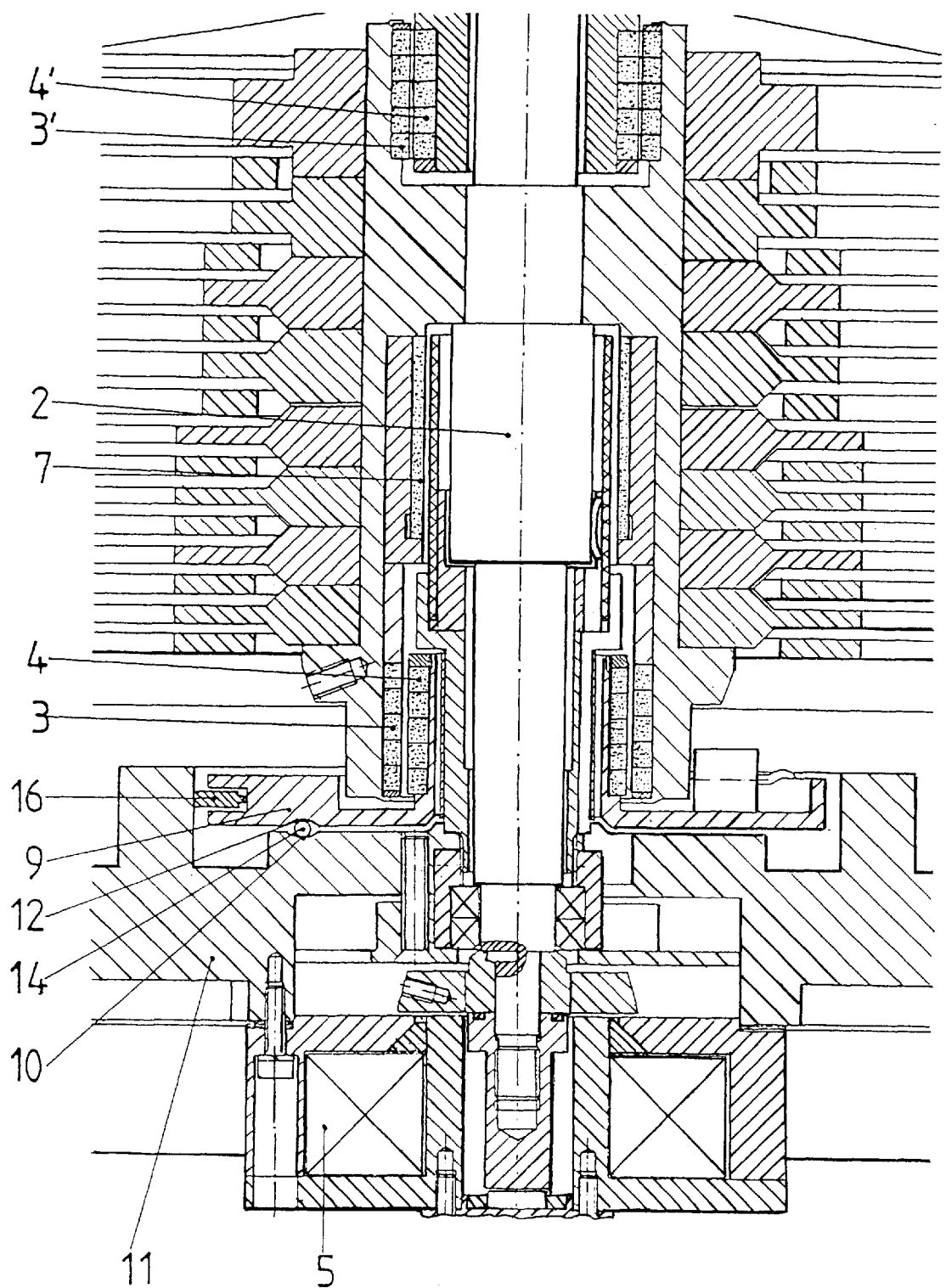
FIG. 1 shows a cross-sectional view of a turbomolecular pump with a damping device for a magnetically supported rotor according to the present invention.
Figure 2:
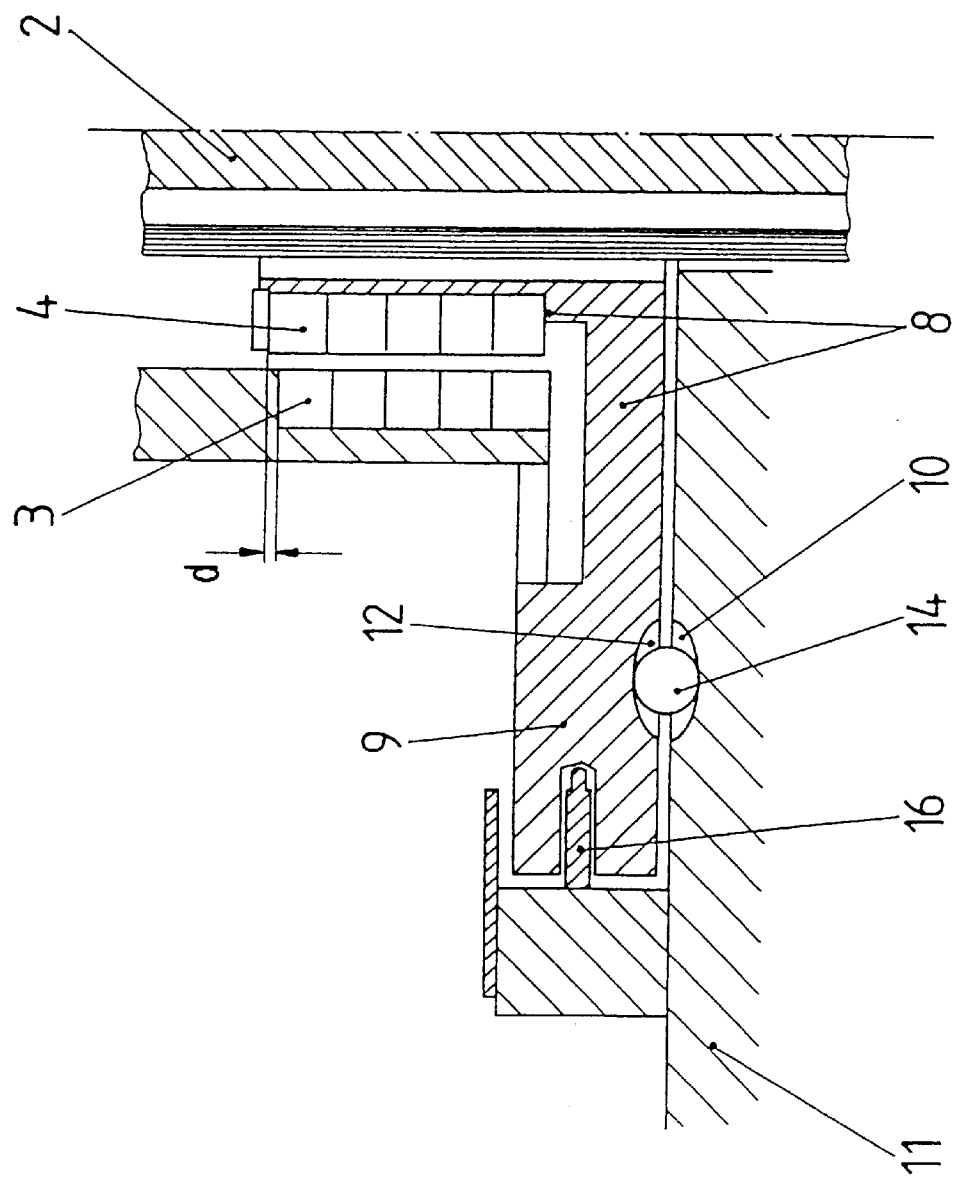
FIG. 2 shows a partial cross-sectional view of the turbomolecular pump shown in FIG. 1, together with the damping device according to the present invention at an increased scale.
Figure 3:
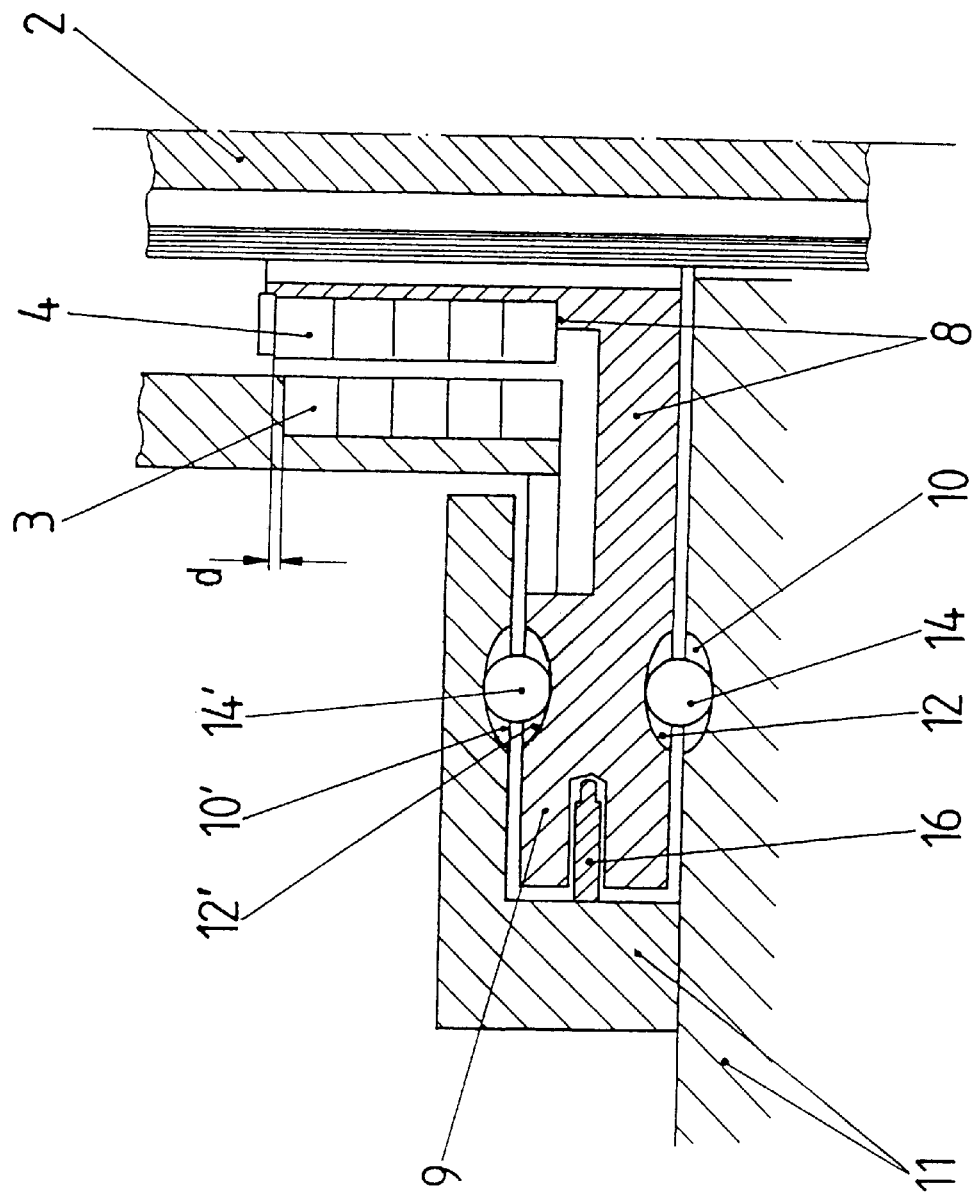
FIG. 3 shows a cross-sectional view illustrating arrangement of balls and spherical recesses on opposite sides of an intermediate member according to the present invention.

A damping device for a magnetically supported rotor according to the present invention will be described below by an example of the use of the damping device in a turbomolecular pump. In the turbomolecular pump shown in FIG. 1, the rotor 2 is supported by a single-axis, actively controlled arrangement of magnetic bearings which consists of a passive radial bearing and an active axial bearing. The passive radial bearing consists of two parts each formed of a rotor magnet 3,3' and a stator magnet 4,4'. The axial bearing is represented by a coil 5 of an electromagnet. The drive of the turbomolecular pump is designated with reference numeral 7.

Damping between the rotor 2 and a member 11 fixedly attached to the pump housing is effected with an intermediate member 8. The intermediate member is formed of the stator magnet 4 of the lower passive radial bearing part and a platform 9. The intermediate member 8 is connected with the rotor 2 by the stator magnet 4 and the rotor magnet 3 of the lower radial bearing part. The intermediate member 8 is connected with a stationary member 11 by balls 14. The balls 14 lie in spherical recesses 10,12 formed in the stationary member 11 and the platform 9. The balls 14 are formed according to the present invention of an elastically deformable material the modulus of elasticity of which is smaller than that of a metal. In this way, the damping action is integrated in the bearing elements themselves. In accordance with another embodiment of a damping device according to the present invention, it is the surfaces of the spherical recesses 10,12 are formed of an elastically deformable material and the balls are formed of metal. In addition, the intermediate member 8 can be connected with the stationary or housing part 11 by damping elements 16.

By offsetting the rotor magnet 3 relative to the stator magnet 4 by an amount d, an axial force, which acts on the intermediate member 8, is provided. This force presses the intermediate member 8 against the ball 14 and, thereby, against the housing part 11. The rotor 2 is retained in its axially set position by controlled electromagnets. If the rotor 2 deviates from its set radial position, the intermediate member 8 will also deviate in a radial direction because of the connection of the intermediate member 8 with the rotor 2 by the rotor and stator magnets 3 and 4 of the lower radial bearing part. Because the intermediate member 8 is supported by the balls 14 and the balls 14 themselves lie in the spherical recesses 10,12, a return force is generated upon the radial deviation of the rotor 2 and the intermediate member 8. This return force depends on the difference between the radii of the ball 14 and the spherical recess 10,12 and on the magnitude of the deviation. In order to fix the position of the rotor 2 in both axial directions, a similar arrangement of balls 14' and spherical recesses 10', 12' can be provided on an opposite side of the intermediate member 8. The additional damping elements to permit to additionally damp the radial movements of the intermediate member 8. Thus, the radial movements of the rotor 2 are damped with aid of the rotor and stator magnets 3 and 4, respectively, of the lower passive radial bearing. Axial movements of the intermediate member 8 is negligibly small when small radial deviation of the intermediate member 8 occur. This requires that the axial stiffness be greater than the radial stiffness. The greater axial stiffness of the intermediate member 8 with respect to its radial stiffness is achieved by using a sufficiently large amount of balls 14.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A damping device for a rotor supported by an arrangement of magnetic bearings including at least one radial bearing formed of a stator magnet and a rotor magnet, the damping device comprising:

an intermediate member fixedly connected with the rotor by the stator magnet of the at least one radial bearing; and means for connecting the intermediate member with a stationary part in an axial direction, the connecting means comprising spherical recesses formed in the intermediate member and in the stationary part and balls located in opposite recesses of the intermediate member and the stationary part, wherein the spherical recesses have a diameter larger than a diameter of the balls, and wherein the balls are formed of an elastically deformable material having a modulus of elasticity smaller than a modulus of elasticity of a metal.

2. A damping device as set forth in claim 1, further comprising damping means for connecting the intermediate member with the stationary part in a radial direction.

3. A damping device as set forth in claim 1, wherein the spherical recesses are formed on opposite sides of the intermediate member and on respective sides of the stationary part.

4. A damping device as set forth in claim 1, wherein a number of balls is so selected that an axial stiffness of the intermediate member is greater than a radial stiffness thereof.

5. A damping device for a rotor supported by an arrangement of magnetic bearings including at least one radial bearing formed of a stator magnet and a rotor magnet, the damping device comprising:

an intermediate member fixedly connected with the rotor by the stator magnet of the at least one radial bearing; and means for connecting the intermediate member with a stationary part in an axial direction, the connecting means comprising spherical recesses formed in the intermediate member and in the stationary part and balls located in opposite recesses of the intermediate member and the stationary part, wherein the spherical recesses have a diameter larger than a diameter of the balls, and wherein surfaces of the spherical recesses are formed of an elastically deformable material having a modulus of elasticity smaller than a modulus of elasticity of a metal.

6. A damping device as set forth in claim 5, further comprising damping means for connecting the intermediate member with the stationary part in a radial direction.

7. A damping device as set forth in claim 5, wherein the spherical recesses are formed on opposite sides of the intermediate member and on respective sides of the stationary part.

8. A damping device as set forth in claim 5, wherein a number of balls is so selected that an axial stiffness of the intermediate member is greater than a radial stiffness thereof.

* * * * *